(12) United States Patent
Chen et al.

(10) Patent No.: US 7,728,059 B2
(45) Date of Patent: *Jun. 1, 2010

(54) POLYCARBONATE COMPOSITIONS AND ARTICLES FORMED THEREFROM

(75) Inventors: Jing Chen, Haidian District (CN); Hua Jiao, Shijiazhuang (CN); Yegang Lin, Pudong New District (CN); Jingwu Yang, Jing An District (CN); XinMin Yang, Shanghai (CN)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 253 days.

This patent is subject to a terminal disclaimer.

(21) Appl. No.: 11/353,732

(22) Filed: Feb. 14, 2006

(65) Prior Publication Data

US 2007/0191518 A1 Aug. 16, 2007

(51) Int. Cl.
C08K 5/36 (2006.01)
C08K 5/41 (2006.01)
C08K 5/42 (2006.01)

(52) U.S. Cl. ............. 524/155; 524/494; 524/158; 524/500; 524/170

(58) Field of Classification Search ............ 524/155, 524/494
See application file for complete search history.

(56) References Cited

U.S. PATENT DOCUMENTS

| 3,671,487 | A | 6/1972 | Abolins |
|---|---|---|---|
| 3,723,373 | A | 3/1973 | Lucas |
| 3,775,367 | A | 11/1973 | Nouvertne |
| 3,971,756 | A | 7/1976 | Bialous et al. |
| 4,028,297 | A | 6/1977 | Webb |
| 4,110,299 | A | 8/1978 | Mark |
| 4,130,530 | A | 12/1978 | Mark et al. |
| 4,303,575 | A | 12/1981 | Reinert |
| 4,335,038 | A | 6/1982 | Thomas |
| 4,552,911 | A | 11/1985 | Cohnen et al. |
| 4,916,194 | A | 4/1990 | Policastro et al. |
| 5,218,027 | A | 6/1993 | Smith et al. |
| 5,360,861 | A | 11/1994 | Campbell |
| 5,508,323 | A | 4/1996 | Romenesko et al. |
| 6,353,046 | B1 | 3/2002 | Rosenquist et al. |
| 6,405,759 | B1 | 6/2002 | Boeye |
| 6,613,824 | B2 | 9/2003 | Campbell et al. |
| 6,657,018 | B1 * | 12/2003 | Hoover ............ 525/464 |
| 6,727,302 | B2 * | 4/2004 | Goossens et al. .... 524/161 |
| 6,790,899 | B2 * | 9/2004 | Singh et al. ........ 524/460 |
| 7,632,881 | B2 * | 12/2009 | Chen et al. ........ 524/158 |
| 2002/0099128 | A1 | 7/2002 | Patel et al. |
| 2007/0191519 | A1 * | 8/2007 | Jiao et al. ........ 524/156 |

FOREIGN PATENT DOCUMENTS

WO 0029483 A1 5/2000

OTHER PUBLICATIONS

PCT International Search Report for International Application No. PCT/US2007/001689.

* cited by examiner

*Primary Examiner*—Mark Eashoo
*Assistant Examiner*—Noah Frank

(57) ABSTRACT

A composition is disclosed having minimum halogen content, fire-retardance and/or drip-resistant characteristics. The composition comprises an effective amount of a polycarbonate, a glass fiber, a polysiloxane-polycarbonate copolymer, and a synergistic combination of an aromatic sulfone sulfonate such as potassium diphenylsulfone sulfonate with an aromatic sulfonate such as sodium salt of toluene sulfonic acid, optionally in the presence of an anti-drip agent. The polycarbonate composition is useful for manufacture of electronic and mechanical articles, among others.

23 Claims, No Drawings

POLYCARBONATE COMPOSITIONS AND ARTICLES FORMED THEREFROM

BACKGROUND

This disclosure relates, in various exemplary embodiments, to polycarbonate compositions and articles formed from such compositions having minimum halogen content and improved fire-retardance and/or drip-resistant characteristics, as well as uses thereof. For example, the disclosure relates to glass fiber reinforced polycarbonate based resin compositions having robust thin-wall fire-retardance, acceptable impact resistance, and good manufacturing and processing characteristics.

With their strength and clarity, polycarbonate (PC) and copolycarbonate resins offer many significant advantages and are utilized for a number of different commercial applications. Polycarbonate materials are playing a vital role today in applications including electronic engineering ("E&E") parts, mechanical parts and so on. Unfortunately, polycarbonate resins are inherently flammable and can drip hot molten material causing nearby materials to catch fire as well. Thus, in order to safely utilize polycarbonates in many applications, it is necessary to include additives which retard the flammability of the material and/or which reduce dripping.

A variety of different materials have been described for use in producing fire-retardant (FR) and/or drip-resistant polycarbonates. Exemplary of these are the materials described in U.S. Pat. Nos. 3,971,756; 4,028,297; 4,110,299; 4,130,530; 4,303,575; 4,335,038; 4,552,911; 4,916,194; 5,218,027; and, 5,508,323.

Fire-retardance additives applied today typically include various sulfonate salts, phosphorus acid esters, brominated and/or chlorinated flame retardants, etc. Moreover, the phosphate additives, which are used at relatively high loadings (>5% and around 10% to produce similar V0 performance) will deteriorate overall material mechanical performance. Furthermore, brominated and chlorinated additives, and even some fluorinated additives at certain loadings are prohibited by various NGO's and environmental protection rules, such as Blue Angle, TCO'99, DIN/VDE, etc. Consequently, sulfonate salts have become fairly widely used in the industry to produce fire-retardant polycarbonate materials.

Examples of such sulfonate salts are perfluoroalkane sulfonates, such as potassium perfluorobutane sulfonate ("KPFBS", also known as "Rimar salt") and potassium diphenylsulfone sulfonate ("KSS"). For example, the use of perfluoroalkane sulfonates in polycarbonate resins is described in U.S. Pat. No. 3,775,367. Also, U.S. Pat. No. 6,353,046 discloses that improved fire properties can be imparted to polycarbonate resin compositions by incorporating into the polycarbonate, potassium perfluorobutane sulfonate, and a cyclic siloxane, such as octaphenylcyclotetrasiloxane.

For KSS, only limited fire-retardance performance can be obtained when it is used alone. The conventional means for enhancing the fire-retardant properties while retaining transparency has been the incorporation of soluble organic halogen additives with KSS. For example, commercial grades of LEXAN® (General Electric Co.) polycarbonate resins (e.g. 940A, 920A) contain a combination of KSS (0.3 phr) and a tetrabromo-bisphenol/bisphenol A copolymer (0.5 phr, net 0.13 phr bromine content). Without the bromine, the 920A and 940A grades have inconsistent/unreliable performance in the UL94 VO 125 mil flammability test that these grades are designed to meet.

On the other hand, environmental concerns and guidelines directed to these issues are of particular importance today. Such regulations and guidelines include Blue-Angel, TCO99, and DIN/VDE. For example, current "eco-FR" LEXAN®, which is mostly loaded with Rimar salt at a level of 0.05-0.08%, is not Blue Angel conforming because of the fluorine content. Moreover, Rimar can generate bubbles that cause haze under higher processing temperatures. The brominated additive used in conjunction with KSS is not suitable for consumer products which are subject to "ECOs-friendly" standards, since these standards prohibit the inclusion of bromine or chlorine based fire-retardance additives.

Additionally, it is known that glass fiber reinforced polycarbonates have been widely used for their good combination of mechanical properties and heat resistance, and grades of such polycarbonates with fire retardance are playing a vital role today in various applications including E&E parts, mechanical structure parts and so on. Use of these resins has been increasing rapidly in recent years with related industrial development. Moreover, there are increasing market needs for new formulations with high FR ratings, and thinner gages.

An issue with manufacturing such glass fiber reinforced polycarbonate compositions is, however, that they do not have robust fire retardance performance, particularly with the inclusion of rigid particles, such as titanium oxide.

There accordingly remains a need in the art for the production of polycarbonate compositions with certain amounts of glass fiber that can readily produce an article of manufacture with minimum content of halogen, such as bromine and chlorine. These compositions also need to exhibit good fire-retardancy and drip-resistance, in a cost-effective manner, have thinner gages, and good manufacturability characteristics, among others.

SUMMARY

A composition is disclosed herein having minimum halogen content and enhanced fire-retardance and/or drip-resistant properties. The composition comprises an effective amount of a polycarbonate, a glass fiber, a polysiloxane-polycarbonate copolymer, and a synergic combination of an aromatic sulfone sulfonate, such as potassium diphenylsulfone sulfonate, with an aromatic sulfonate, such as sodium salt of toluene sulfonic acid, optionally in the presence of an anti-drip agent such as fluoropolymer-based anti-drip agents to produce the properties desired. The polycarbonate composition is useful for manufacture of articles, such as molded electronic and mechanical parts, among others.

In another aspect, a flame retardant composition is disclosed comprising an effective amount of a polycarbonate, a glass fiber, a polysiloxane-polycarbonate copolymer, an aromatic sulfone sulfonate, an aromatic sulfonate and, optionally, an anti-drip agent, to produce an article having a UL 94 flammability rating at 1.6 mm of V0.

In a further aspect, the present disclosure provides a composition, such as a thermoplastic composition, that has minimum halogen content, i.e. no more than about 0.1% by weight halogen based on the total weight of the composition, and improved fire-retardance and/or drip-resistant characteristics. The composition comprises (i) 100 parts by weight of polycarbonate; (ii) from about 5 parts to about 40 parts by weight of glass fibers; (iii) from about 5 parts to about 30 parts by weight of a polysiloxane-polycarbonate copolymer; (iv) from about 0.0001 parts to about 0.2 parts by weight of an aromatic sulfone sulfonate; (v) from about 0.002 parts to about 0.5 parts by weight of an aromatic sulfonate; and (vi)

optionally from about 0.01 parts to about 0.3 parts by weight of a fluoropolymer-based anti-drip agent.

In still another aspect, the present disclosure provides an article manufactured from the noted compositions, such as an electronic or a mechanical part. For example, the compositions can be utilized to produce a molded flame retardant part having a UL 94 V0 rating at a thickness of 1.6 mm. In a still further aspect, the composition can be utilized to produce alternative flame retardant articles, such as a molded part having a UL 90 rating at a thickness of 1.2 mm.

These and other non-limiting features and/or characteristics of the embodiments of the present disclosure are more particularly exemplified by the following detailed description.

DETAILED DESCRIPTION

Disclosed herein is a glass fiber reinforced polycarbonate composition, which comprises a synergic combination of an aromatic sulfone sulfonate, such as potassium diphenylsulfone sulfonate (KSS), with an aromatic sulfonate, such as sodium salt of toluene sulfonic acid (NaTS), optionally in the presence of an anti-drip agent such as Teflon™-grafted styrene-acrylonitrile copolymer (TSAN). The polycarbonate composition exhibits particular desirable properties such as minimum halogen content and improved fire-retardance and/or drip-resistant characteristics, among others.

As used herein, the term "polycarbonate" refers to a polymer comprising the same or different carbonate units, or a copolymer that comprises the same or different carbonate units, as well as one or more units other than carbonate (i.e. copolycarbonate); the term "aliphatic" refers to a hydrocarbon radical having a valence of at least one comprising a linear or branched array of carbon atoms which is not cyclic; "aromatic" refers to a radical having a valence of at least one comprising at least one aromatic group; "cycloaliphatic" refers to a radical having a valence of at least one comprising an array of carbon atoms which is cyclic but not aromatic; "alkyl" refers to a straight or branched chain monovalent hydrocarbon radical; "alkylene" refers to a straight or branched chain divalent hydrocarbon radical; "alkylidene" refers to a straight or branched chain divalent hydrocarbon radical, with both valences on a single common carbon atom; "alkenyl" refers to a straight or branched chain monovalent hydrocarbon radical having at least two carbons joined by a carbon-carbon double bond; "cycloalkyl" refers to a non-aromatic alicyclic monovalent hydrocarbon radical having at least three carbon atoms, with at least one degree of unsaturation; "cycloalkylene" refers to a non-aromatic alicyclic divalent hydrocarbon radical having at least three carbon atoms, with at least one degree of unsaturation; "aryl" refers to a monovalent aromatic benzene ring radical, or to an optionally substituted benzene ring system radical system fused to at least one optionally substituted benzene rings; "aromatic radical" refers to a radical having a valence of at least one comprising at least one aromatic group; examples of aromatic radicals include phenyl, pyridyl, furanyl, thienyl, naphthyl, and the like; "arylene" refers to a benzene ring diradical or to a benzene ring system diradical fused to at least one optionally substituted benzene rings; "acyl" refers to a monovalent hydrocarbon radical joined to a carbonyl carbon atom, wherein the carbonyl carbon further connects to an adjoining group; "alkylaryl" refers to an alkyl group as defined above substituted onto an aryl as defined above; "arylalkyl" refers to an aryl group as defined above substituted onto an alkyl as defined above; "alkoxy" refers to an alkyl group as defined above connected through an oxygen radical to an adjoining group; "aryloxy" refers to an aryl group as defined above connected through an oxygen radical to an adjoining group; the modifier "about" used in connection with a quantity is inclusive of the stated value and has the meaning dictated by the context (e.g., includes the degree of error associated with measurement of the particular quantity); "optional" or "optionally" means that the subsequently described event or circumstance may or may not occur, and that the description includes instances where the event occurs and instances where it does not; and "direct bond", where part of a structural variable specification, refers to the direct joining of the substituents preceding and succeeding the variable taken as a "direct bond".

Compounds are described herein using standard nomenclature. A dash ("—") that is not between two letters or symbols is used to indicate a point of attachment for a substituent. For example, —CHO is attached through the carbon of the carbonyl (C=O) group. The singular forms "a," "an," and "the" include plural referents unless the context clearly dictates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another.

The composition comprises effective amounts of components to produce the minimum halogen content, and improved fire-retardance and/or drip-resistant characteristics. In one embodiment, the disclosure provides a flame retardance (FR) composition such as a thermoplastic composition, which comprises:

(i) 100 parts by weight of polycarbonate;

(ii) from about 5 parts to about 40 parts by weight of glass fibers;

(iii) from about 5 parts to about 30 parts by weight of a polysiloxane-polycarbonate copolymer;

(iv) from about 0.0001 parts to about 0.2 parts by weight of an aromatic sulfone sulfonate;

(v) from about 0.002 parts to about 0.5 parts by weight of an aromatic sulfonate; and (vi) optionally from about 0.01 parts to about 0.3 parts by weight of an anti-drip agent.

In a further embodiment, the aromatic sulfone sulfonate comprises a formula (K-1) compound:

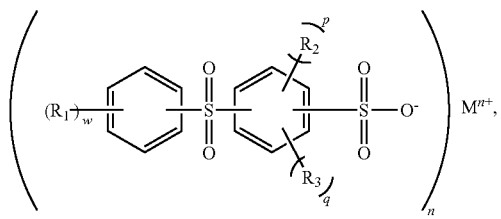

wherein $R_1$, $R_2$, and $R_3$ are independently selected from a $C_1$-$C_6$ alkyl group such as methyl and ethyl; M is a metal such as sodium or potassium; n is an integer and $1 \leq n \leq 3$; w is an integer and $0 \leq w \leq 5$; p and q are integers, $p \geq 0$, $q \geq 0$, and $p+q \leq 4$.

For example, in formula (K-1), M may be potassium, n=1, and w=p=q=0. The component (iv) of the thermoplastic com position is therefore potassium diphenylsulfone sulfonate (KSS), e.g. a formula (K-2) compound:

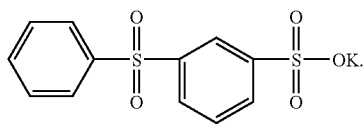

In another embodiment, the aromatic sulfonate comprises a formula (N-1) compound:

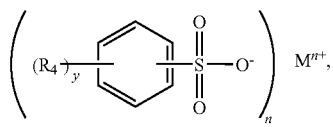

wherein $R_4$ is selected from a $C_1$-$C_6$ alkyl group such as methyl and ethyl; M is a metal such as sodium or potassium; n is an integer and $1 \leq n \leq 3$; y is an integer and $0 \leq y \leq 5$.

For example, in formula (N-1), $R_4$ may be a p-methyl group, M may be sodium, n=1, and y=1. The component (v) of the thermoplastic composition may therefore be a formula (N-2) compound, or a sodium salt of toluene sulfonic acid (NaTS):

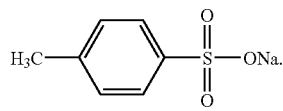

In a further embodiment, the anti-drip agent used in the composition may be any suitable additive which increases the melt strength of the polycarbonate, thereby reducing the tendency of the resin, when heated close to melting, to drip. Examples of suitable anti-drip agents include fluoropolymer-based anti-drip agents. Suitable fluoropolymers and methods for making such fluoropolymers are known, such as for example, U.S. Pat. Nos. 3,671,487 and 3,723,373. Suitable fluoropolymers include homopolymers and copolymers that comprise structural units derived from one or more fluorinated alpha-olefin monomers. The term "fluorinated alpha-olefin monomer" means an alpha-olefin monomer that includes at least one fluorine atom substituent. Suitable fluorinated alpha-olefin monomers include, e.g., fluoroethylenes such as, tetrafluoroethylene, trifluoroethylene, 1,1-difluoroethylene, fluoroethylene, 1,1-difluoro-2-chloroethylene, 1,1-difluoro-1,1-dichloroethylene, 1,2-difluoro-1,2-dichloroethylene, 1-fluoro-2,2-dichloroethylene, 1-chloro-1-fluoroethylene, and 1,1,2-trichloro-2-fluoroethylene; and fluoropropylenes, such as e.g., hexafluoropropylene, 1,1,1,3-tetrafluoropropylene, 1,1,1,3,3-pentafluoropropylene, and 1,1,1,2-tetrafluoropropylene. In other embodiments, suitable fluorinated alpha-olefin copolymers include copolymers comprising structural units derived from two or more fluorinated alpha-olefin copolymers such as, e.g., poly(tetrafluoroethylene-hexafluoropropylene), and copolymers comprising structural units derived from one or more fluorinated monomers and one or more non-fluorinated monoethylenically unsaturated monomers that are copolymerizable with the fluorinated monomers such as, e.g., poly(tetrafluoroethylene-ethylene-propylene) copolymers. Suitable non-fluorinated monoethylenically unsaturated monomers include e.g., alpha-olefin monomers such as, e.g., ethylene, propylene, butene, acrylate monomers such as e.g., methyl methacrylate, butyl acrylate, vinyl ethers, such as, e.g., cyclohexyl vinyl ether, ethyl vinyl ether, n-butyl vinyl ether, vinyl esters such as, e.g., vinyl acetate, and vinyl versatate. The fluoropolymer can be incorporated in the composition by any of the methods known in the art, such as those disclosed in U.S. Pat. No. 6,613,824, issued Sep. 2, 2003.

In a still further embodiment, the fluoropolymer is used in the form of encapsulated fluoropolymer. A specific encapsulated fluoropolymer is a styrene-acrylonitrile copolymer encapsulated polytetrafluoroethylene (PTFE), or Teflon™-grafted styrene-acrylonitrile copolymer (TSAN). TSAN can be made by copolymerizing styrene and acrylonitrile in the presence of an aqueous dispersion/emulsion of Teflon™ so as to get partially SAN-encapsulated Teflon™ particles. TSAN can, for example, comprise about 50 wt % PTFE and about 50 wt % styrene-acrylonitrile copolymer, based on the total weight of the encapsulated fluoropolymer. The styrene-acrylonitrile copolymer can, for example, be from about 75 wt % styrene to about 25 wt % acrylonitrile based on the total weight of the copolymer. TSAN offers significant advantages over polytetrafluoroethylene, namely TSAN is more readily dispersed in the composition. The TSAN particles typically have a particle size of about 35 to about 70 micrometers, and specifically about 40 to about 65 micrometers.

In another embodiment, the content of halogen, such as fluorine (F), is controlled to be no more than about 0.1% by weight, based on the total weight of the flame retardant composition, in order to fulfill some ECO regulations, such as DIN/VDE.

The glass fibers included in the composition disclosed herein are well known to those skilled in the art and are widely available from a number of manufacturers. For compositions ultimately to be employed for electrical uses, it is preferred to use fibrous glass filaments comprised of lime-aluminum borosilicate glass that is relatively sodium free. This is known as "E" glass. However, other glass compositions are useful. All such glasses are contemplated as within the scope of the present disclosure. The filaments are made by standard processes, e.g., by steam or air blowing, flame blowing and mechanical pulling. An example of desirable filaments for plastics reinforcement are made by mechanical pulling. The filament diameters may range from about 0.00012 to about 0.00075 inches, but this not critical to the present disclosure. It is known, however, to those skilled in the art, that smaller filament diameters will also increase the strength of plastics treated therewith.

The length of the glass filaments and whether or not they are bundled into fibers and the fibers bundled in turn to yarns, ropes or rovings, or woven into mats, and the like are also not critical to the disclosure. However, in preparing the molding compositions of the present disclosure, it is convenient to use filamentous glass in the form of chopped strands of from about one-eighth to about 2 inches long. In articles molded from the compositions, on the other hand, even shorter lengths will be encountered because, during compounding, considerable fragmentation will occur.

For example, Glass fibers may include Owens Corning CRATEC® brand dry chopped strand fiber grade 415A (non-bonding grade with a silane sizing) (4 mm length).

Glass fibers useful in the disclosure may be treated with chemical coatings called "sizing" agents. Sizing agents may be applied to glass fiber as described, for example, in U.S. Pat.

No. 6,405,759. Examples of some sizing agents include film-forming polymeric materials (e.g., low molecular weight epoxy emulsions), organosilanes, coupling or keying agents, cationic or nonionic lubricants, processing aids, silanes, organofunctional silanes (e.g., 3-glycidoxypropyltrimethoxy silane, 3-aminopropyltriethoxysilane and 3-methacryloxypropyltrimethoxysilane), and cross-linking agents (e.g., bis-silane and antioxidants).

In an embodiment, the glass fibers useful in the disclosure are surface treated with reagent to protect fiber.

In another embodiment, the disclosure provides a glass fiber reinforced polycarbonate composition, which comprises:

(i) 100 parts by weight of polycarbonate;
(ii) from about 5 parts to about 40 parts by weight of glass fibers;
(iii) from about 5 parts to about 30 parts by weight of a polysiloxane-polycarbonate copolymer;
(iv) from about 0.0001 parts to about 0.2 parts by weight of an aromatic sulfone sulfonate;
(v) from about 0.002 parts to about 0.5 parts by weight of an aromatic sulfonate; and
(vi) optionally from about 0.01 parts to about 0.26 parts by weight of an anti-drip agent.

The amount of glass fiber is generally from about 5 parts to about 40 parts by weight, specifically it can be from about 5 parts to about 30 parts by weight, including from about 6 parts to about 20 parts by weight, and most specifically it can be from about 7 parts to about 9 parts by weight, based upon the total weight of polycarbonate in the composition.

The amount of polysiloxane-polycarbonate copolymer is generally from about 5 parts by weight to about 30 parts by weight, including from about 8 parts by weight to about 25 parts by weight, more specifically, from about 10 parts by weight to about 25 parts by weight, including from about 12 parts by weight to about 20 parts by weight, based on the total weight of polycarbonate in the composition. The polysiloxane content of the resin composition, as provided by the polysiloxane-polycarbonate present therein, can be present in an amount of from about 0.25 to about 6 wt %, specifically from about 0.4 to about 5 wt %, and more specifically from about 0.6 to about 4 wt %, of the resin composition, based on the total weight of component (i) polycarbonate in the composition.

The amount of aromatic sulfone sulfonate, such as KSS, is generally from about 0.0001 parts to about 0.2 parts by weight, specifically it can be from about 0.0003 parts to about 0.01 parts by weight, including from about 0.0005 parts to about 0.005 parts by weight, and most specifically it can be from about 0.00066 parts to about 0.001 parts by weight, based upon the total weight of polycarbonate in the composition.

The amount of aromatic sulfonate, such as NaTS, is generally from about 0.002 parts to about 0.5 parts by weight, including from about 0.006 parts to about 0.2 parts by weight, more specifically it can be from about 0.02 parts to about 0.1 parts by weight, and most specifically it can be from about 0.04 parts to about 0.055 parts by weight, based on the total weight of polycarbonate in the composition.

The amount of anti-drip agent, such as TSAN, is generally from about 0.01 parts to about 0.3 parts by weight, specifically it can be from about 0.05 parts to about 0.26 parts by weight, including from about 0.1 parts to about 0.26 parts by weight, and most specifically it can be from about 0.15 parts to about 0.26 parts by weight based on the total weight of polycarbonate in the composition.

In another embodiment, the composition is incorporated with an aqueous carrier, which, under certain conditions, results in superior fire-retardant performance. For example, in a more particular embodiment, one or more of the two exemplary salts identified above, i.e. KSS and NaTS, may be pre-mixed in a suitable solvent such as water, and then formulated into the composition in accordance with the disclosure.

The polycarbonate of the composition can comprise repeating structural carbonate units of the formula (1):

in which $R^1$ group may be selected from any aromatic radicals, alicyclic radicals, and aliphatic radicals. In an embodiment, at least 60% of the $R^1$ groups are aromatic organic radicals.

In a further embodiment, $R^1$ is an aromatic organic radical, for example a radical of the formula (2):

$$-A^1-Y^1-A^2- \quad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

In another embodiment, the polycarbonate can comprise repeating structural carbonate units of the formula (A-1):

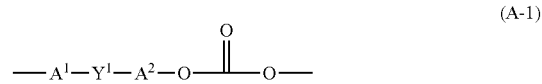

wherein $Y^1$, $A^1$ and $A^2$ are as described above.

In yet another embodiment, polycarbonates may be produced via the interfacial reaction of dihydroxy compounds having the formula HO—$R^1$—OH, which includes dihydroxy compounds of formula (3):

$$HO-A^1-Y^1-A^2-OH \quad (3)$$

wherein $Y^1$, $A^1$ and $A^2$ are as described above.

In still another embodiment, polycarbonates may be produced via the interfacial reaction of bisphenol compounds of general formula (4):

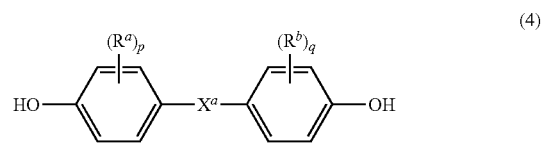

wherein $R^a$ and $R^b$ each represent a halogen atom or a monovalent hydrocarbon group and may be the same or different; p and q are each independently integers of 0 to 4; and $X^a$ represents one of the groups of formula (5):

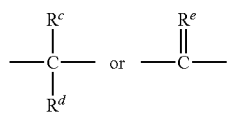

(5)

wherein $R^c$ and $R^d$ each independently represent a hydrogen atom or a monovalent linear or cyclic hydrocarbon group and $R^e$ is a divalent hydrocarbon group.

In yet a further embodiment, polycarbonates may be produced via the interfacial reaction of one or more bisphenol compounds of general formula (B-1):

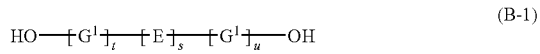

(B-1)

wherein each $G^1$ is independently at each occurrence a $C_6$-$C_{20}$ aromatic radical; E is independently at each occurrence a bond, a $C_3$-$C_{20}$ cycloaliphatic radical, a $C_3$-$C_{20}$ aromatic radical, a $C_1$-$C_{20}$ aliphatic radical, a sulfur-containing linkage, a selenium-containing linkage, a phosphorus-containing linkage, or an oxygen atom; "t" is a number greater than or equal to one; "s" is either zero or one; and "u" is a whole number including zero.

Some illustrative, non-limiting examples of suitable dihydroxy compounds include the following: resorcinol; $C_{1-3}$ alkyl-substituted resorcinols; 4-bromoresorcinol, hydroquinone, 4,4'-dihydroxybiphenyl, 1,6-dihydroxynaphthalene, 2,6-dihydroxynaphthalene, 1,I-bis(4-hydroxyphenyl)cyclopentane; 2,2-bis(3-allyl-4-hydroxyphenyl)propane; 2,2-bis(2-t-butyl-4-hydroxy-5-methylphenyl)propane; 2,2-bis(3-t-butyl-4-hydroxy-6-methylphenyl)propane; 2,2-bis(3-t-butyl-4-hydroxy-6-methylphenyl)butane; 1,3-bis[4-hydroxyphenyl-1-(1-methylethylidine)]benzene; 1,4-bis[4-hydroxyphenyl-I-(1-methylethylidine)]benzene; 1,3-bis[3-t-butyl-4-hydroxy-6-methylphenyl-1-(1-methylethylidine)]benzene; 1,4-bis[3-t-butyl-4-hydroxy-6-methylphenyl-I-(1-methylethylidine)]benzene; 4,4'-biphenol; 2,2',6,8-tetramethyl-3,3',5,5'-tetrabromo-4,4'-biphenol; 2,2',6,6'-tetramethyl-3,3',5-tribromo-4,4'-biphenol; 1,I-bis(4-hydroxyphenyl)-2,2,2-trichloroethane; 1,1-bis(4-hydroxyphenyl)-1-cyanoethane; 1,I-bis(4-hydroxyphenyl)dicyanomethane; I,I-bis(4-hydroxyphenyl)-1-cyano-1-phenylmethane; 2,2-bis(3-methyl-4-hydroxyphenyl)propane; 1,1-bis(4-hydroxyphenyl)norbornane; 3,3-bis(4-hydroxyphenyl)phthalide; 1,2-bis(4-hydroxyphenyl)ethane; 1,3-bis(4-hydroxyphenyl)propenone; bis(4-hydroxyphenyl)sulfide; 4,4'-oxydiphenol; 4,4-bis(4-hydroxyphenyl)pentanoic acid; 4,4-bis(3,5-dimethyl-4-hydroxyphenyl)pentanoic acid; 2,2-bis(4-hydroxyphenyl) acetic acid; 2,4'-dihydroxydiphenylmethane; 2-bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (bisphenol-A); 1,1-bis(4-hydroxyphenyl)propane; 2,2-bis(3-chloro-4-hydroxyphenyl)propane; 2,2-bis(3-bromo4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane; 2,2-bis(4-hydroxy-3,5-dimethylphenyl)propane; 2,2-bis(3,5,3',5'-tetrachloro-4,4'-dihydroxyphenyl)propane; 1,1-bis(4-hydroxyphenyl)cyclohexylmethane; 2,2-bis(4-hydroxyphenyl)-1-phenylpropane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 4,4'-[1-methyl-4-(1-methylethyl)-1,3-cyclohexandiyl]bisphenol (1,3 BHPM); 4-[1-[3-(4-hydroxyphenyl)-4-methylcyclohexyl]-1-methyl-ethyl]-phenol (2,8 BHPM); 3,8-dihydroxy-5a,10b-diphenylcoumarano-2',3',2,3-coumarane (DCBP); 2-phenyl-3,3-bis(4-hydroxyphenyl)phthalimidine; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane;

1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane; 1,1-bis(4-hydroxyphenyl)decane; 1,1-bis(4-hydroxyphenyl)cyclododecane; 1,1-bis(3,5-dimethyl-4-hydroxyphenyl)cyclododecane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene)diphenol; 4,4'-bis(3,5-dimethyl)diphenol; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene; 1,4-bis(2-(4-hydroxy-3-methylphenyl)-2-propyl)benzene; 2,4'-dihydroxyphenyl sulfone; 4,4'-dihydroxydiphenylsulfone (BPS); bis(4-hydroxyphenyl)methane; 2,6-dihydroxy naphthalene; hydroquinone; 3-(4-hydroxyphenyl)-1,1,3-trimethylindan-5-ol; 1-(4-hydroxyphenyl)-1,3,3-trimethylindan-5-ol; 4,4-dihydroxydiphenyl ether; 4,4-dihydroxy-3,3-dichlorodiphenylether; 4,4-dihydroxy-2,5-dihydroxydiphenyl ether; 4,4-thiodiphenol; 2,2,2',2'-tetrahydro-3,3,3',3'-tetramethyl-1,1'-spirobi[1H-indene]-6,6'-diol; bis(4-hydroxyphenyl) acetonitrile; bis(4-hydroxyphenyl)sulfoxide; bis(4-hydroxyphenyl)sulfone; 9,9-bis(4-hydroxyphenyl)fluorine; 2,7-dihydroxypyrene; 6,6'-dihydroxy-3,3,3',3'-tetramethylspiro(bis)indane ("spirobiindane bisphenol"); 3,3-bis(4-hydroxyphenyl)phthalide; 2,6-dihydroxydibenzo-p-dioxin; 2,6-dihydroxythianthrene; 2,7-dihydroxyphenoxathin; 2,7-dihydroxy-9,10-dimethylphenazine; 3,6-dihydroxydibenzofuran; 3,6-dihydroxydibenzothiophene; 2,7-dihydroxycarbazole, and the like, as well as combinations comprising at least one of the foregoing dihydroxy compounds.

Specific examples of the types of bisphenol compounds represented by formula (4) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), 1,1-bis(4-hydroxyphenyl)-3,3,5-trimethylcyclohexane (BPI), and 1,1-bis(4-hydroxy-3-methylphenyl)cyclohexane (DMBPC). Combinations comprising at least one of the foregoing dihydroxy compounds may also be used.

In one embodiment, the polycarbonate can comprise repeating structural carbonate units of the formula (A-2):

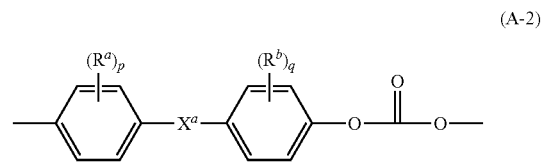

(A-2)

wherein p, q, $R^a$, $R^b$ and $X^a$ are as described above.

In another embodiment, the polycarbonate can comprise repeating structural carbonate units of the formula (A-3), i.e. BPA unit:

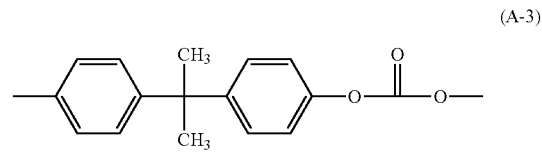

(A-3)

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents may be added at a level of 0.05 to 2.0 wt % of the polycarbonate. All types of polycarbonate end groups are contemplated as being useful in the polycarbonate, provided that such end groups do not significantly affect desired properties of the polycarbonate product.

The polycarbonates may have a weight average molecular weight (Mw) of from about 10,000 to about 40,000, including from about 20,000 to about 30,000, and most specifically from about 24,000 to about 28,000, as measured by gel permeation chromatography (GPC) using a crosslinked styrene-divinyl benzene column, at a sample concentration of 1 milligram per milliliter, and as calibrated with polycarbonate standards.

In an embodiment, the polycarbonate has flow properties suitable for the manufacture of thin articles. Melt volume flow rate (often abbreviated MVR) measures the rate of extrusion of a thermoplastic through an orifice at a prescribed temperature and load. Polycarbonates suitable for the formation of thin articles may have an MVR, measured at 300° C./1.2 kg according to ASTM D1238-04, of 0.5 to 80 cubic centimeters per 10 minutes (cc/10 min). In a specific embodiment, a suitable polycarbonate composition has an MVR measured at 300° C./1.2 kg according to ASTM D1238-04, of 0.5 to 50 cc/10 min, specifically 1 to 25 cc/10 min, and more specifically 3 to 15 cc/10 min. Mixtures of polycarbonates of different flow properties may be used to achieve the overall desired flow property.

Polycarbonates of the disclosure may include copolymers comprising carbonate chain units and other units. A specific suitable copolymer is a polyester-polycarbonate, also known as a copolyester-polycarbonate and polyester-carbonate. Combinations of polycarbonates and polyester-polycarbonates may also be used. As used herein, a "combination" is inclusive of all mixtures, blends, alloys, reaction products, and the like.

However, the amount of polyester-polycarbonate and/or polyester in the composition should maintain such a low level that it causes no adverse effect on the FR property of the composition. For example, the amount of polyester-polycarbonate and/or polyester may be a trace amount, or may be as low as zero.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., 8 to 11. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

A chain stopper (also referred to as a capping agent) may be included during polymerization. The chain-stopper limits molecular weight growth rate, and so controls molecular weight in the polycarbonate. A chain-stopper may be at least one of mono-phenolic compounds, mono-carboxylic acid chlorides, and/or mono-chloroformates.

For example, mono-phenolic compounds suitable as chain stoppers include monocyclic phenols, such as phenol, $C_1$-$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms. A mono-phenolic UV absorber may be used as capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Specifically, mono-phenolic chain-stoppers include phenol, p-cumylphenol, and/or resorcinol monobenzoate.

Mono-carboxylic acid chlorides may also be suitable as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides such as trimellitic anhydride chloride, and naphthoyl chloride; and mixtures of monocyclic and polycyclic mono-carboxylic acid chlorides. Chlorides of aliphatic monocarboxylic acids with up to 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and mixtures thereof.

In one embodiment, the polyester-polycarbonates may be prepared by interfacial polymerization. Rather than utilizing a dicarboxylic acid, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. In one embodiment, an effective amount of a phase transfer catalyst may be 0.1 to 10 wt % based on the weight of bisphenol in the phosgenation mixture. In another embodiment, an effective amount of phase transfer catalyst may be 0.5 to 2 wt % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

As described above, the composition also comprises a polysiloxane-polycarbonate copolymer, also referred to as a polysiloxane-polycarbonate. The polysiloxane (also referred to herein as "polydiorganosiloxane") blocks of the copolymer comprise repeating siloxane units (also referred to herein as "diorganosiloxane units") of formula (8):

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (8) may vary widely depending on the type and relative amount of each component in the thermoplastic composition, the desired properties of the composition, and like considerations. Generally, D may have an average value of 2 to 1,000, specifically 2 to 500, and more specifically 5 to 100. In one embodiment, D has an average value of 10 to 75, and in still another embodiment, D has an average value of 40 to 60. Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polysiloxane-polycarbonate copolymer may be used, wherein the average value of D of the first copolymer is less than the average value of D of the second copolymer.

In one embodiment, the polydiorganosiloxane blocks are provided by repeating structural units of formula (9):

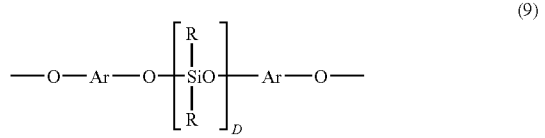

(9)

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Suitable Ar groups in formula (9) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Units of formula (9) may be derived from the corresponding dihydroxy compound of formula (10):

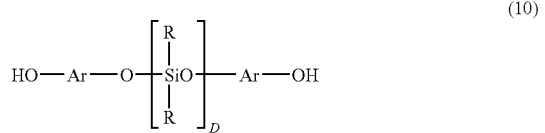

(10)

wherein R, Ar, and D are as described above. Compounds of formula (10) may be obtained by the reaction of a dihydroxyarylene compound with, for example, an alpha, omega-bisacetoxypolydiorangonosiloxane under phase transfer conditions.

In another embodiment, polydiorganosiloxane blocks comprise units of formula (11):

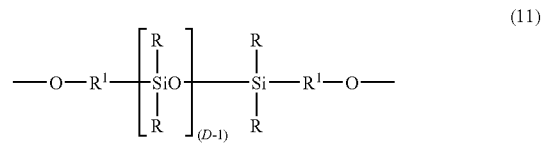

(11)

wherein R and D are as described above, and each occurrence of $R^1$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (12):

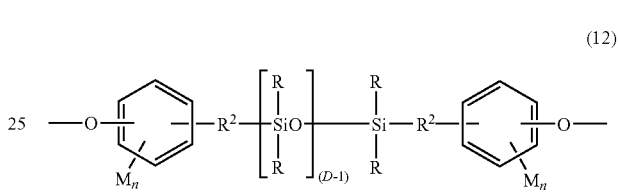

(12)

wherein R and D are as defined above. Each $R^2$ in formula (12) is independently a divalent $C_2$-$C_8$ aliphatic group. Each M in formula (12) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$Cl_2$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

Units of formula (12) may be derived from the corresponding dihydroxy polydiorganosiloxane (13):

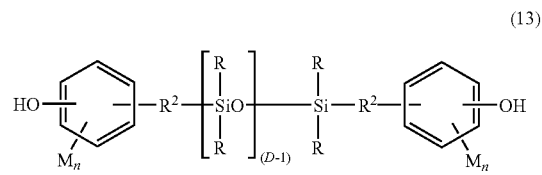

(13)

wherein R, D, M, $R^2$, and n are as described above. Such dihydroxy polysiloxanes can be made by effecting a platinum catalyzed addition between a siloxane hydride of formula (14):

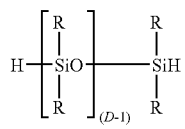

wherein R and D are as previously defined, and an aliphatically unsaturated monohydric phenol. Suitable aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

In another embodiment, the polysiloxane-polycarbonate copolymer comprises from about 50 to about 99 wt % of carbonate units and from about 1 to about 50 wt % siloxane units. Within this range, the polysiloxane-polycarbonate copolymer may comprise from about 70 to about 98 wt %, specifically from about 75 to about 97 wt % of carbonate units and from about 2 to about 30 wt %, specifically from about 3 to about 25 wt % siloxane units.

The polysiloxane-polycarbonate copolymer may have a light transmission greater than or equal to 55%, specifically greater than or equal to 60% and more specifically greater than or equal to 70%, as measured according to ASTM D1003-00. The copolymer may have a haze less than or equal to 50%, specifically less than or equal to 40%, and most specifically less than or equal to 30%, as measured according to ASTM D1003-00.

In one specific embodiment, the polysiloxane-polycarbonate copolymer comprises polysiloxane units, and carbonate units derived from bisphenol A, i.e., the dihydroxy compound of formula (3) in which each of $A^1$ and $A^2$ is p-phenylene and $Y^1$ is isopropylidene. Polysiloxane-polycarbonates may have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polycarbonate standards.

The polysiloxane-polycarbonate copolymer can have a melt volume flow rate, measured at 300° C./1.2 kg, of 1 to 35 cubic centimeters per 10 minutes (cc/10 min), specifically 2 to 30 cc/10 min. Mixtures of polysiloxane-polycarbonates of different flow properties may be used to achieve the overall desired flow property.

Examples of suitable polysiloxane-polycarbonate copolymers which can be utilized herein include those described in U.S. Pat. No. 6,657,018, which is fully incorporated herein by reference. Also included are polysiloxane-polycarbonate copolymers having a larger number of polysiloxane units than those specifically mentioned in U.S. Pat. No. 6,657,018.

In one embodiment, the composition comprises a polysiloxane-polycarbonate copolymer, such as C9030P (General Electric Co.). C9030P is PC-Siloxane copolymer with 20% siloxane segments by weight. The resin composition comprises a polysiloxane-polycarbonate in an amount effective to maintain at least one mechanical property of the thermoplastic composition prepared therefrom, in the presence of further components. The amount of polysiloxane-polycarbonate may range generally from about 5% by weight to about 30% by weight, specifically from about 8% by weight to about 25% by weight, more specifically from about 10% by weight to about 25% by weight, and most specifically from about 12% by weight to about 20% by weight, based on the total weight of component (i) polycarbonate in the composition.

The polysiloxane content of the resin composition, as provided by the polysiloxane-polycarbonate present therein, can be present in an amount of from about 0.25 to about 6 wt %, specifically from about 0.4 to about 5 wt %, and more specifically from about 0.6 to about 4 wt %, of the resin composition, based on the total weight of component (i) polycarbonate in the composition.

Although not wishing to be bound to any particular theory, it is believed that a combination of KSS and NaTS can act synergistically at low levels in polycarbonate compositions, in absence of halogenated flame-retardant additives and in presence of an anti-drip agent. For example, in presence of an anti-drip agent, a combination of 0.005 phr KSS and 0.025 phr NaTS led to UL V0 performance at 1.6 mm, even 1.2 mm.

In one specific embodiment, the flame retardant composition of the disclosure exhibits a robust V0 performance at 1.6 mm, and with the loading of further optimized flame retardant additives, could produce robust V0 at 1.2 mm, while maintaining the excellent mechanical performance of polycarbonates such as those conventionally filled with glass fiber. Furthermore, impact property of the material is very much improved compared to existing products.

In a further embodiment, the composition of the disclosure comprises:

(i) 100 parts by weight of polycarbonate;
(ii) from about 5 parts to about 30 parts by weight of glass fibers;
(iii) from about 5 parts to about 30 parts by weight of a polysiloxane-polycarbonate copolymer;
(iv) from about 0.0001 parts to about 0.2 parts by weight of an aromatic sulfone sulfonate;
(v) from about 0.002 parts to about 0.5 parts by weight of an aromatic sulfonate;
(vi) optionally from about 0.01 parts to about 0.26 parts by weight of an anti-drip agent; and
(vii) one or more optional additives selected from the group consisting of hydrolysis stabilizer, impact modifier, filler/reinforcing agent, visual effect enhancer, antioxidant, heat stabilizer, light stabilizer, ultraviolet light absorber, plasticizer, mold release agent, lubricant, antistatic agent, pigment, dye, flame retardant, processing aid, radiation stabilizer; and combinations thereof.

In various embodiments, additives ordinarily incorporated in the compositions are selected so as not to adversely affect the desired properties of the composition. Mixtures of additives may be used. Such additives may be mixed at a suitable time during the mixing of the components for forming the composition.

The composition of the disclosure may comprise one or more hydrolysis stabilizers for reducing hydrolysis of ester and/or carbonate groups. Typical hydrolysis stabilizers may include carbodiimide-based additives such as aromatic and/or cycloaliphatic monocarbo-diimides substituted in position 2 and 2', such as 2,2',6,6'-tetraisopropyidiphenylcarbodiimide. Polycarbodiimides having a molecular weight of over 500 grams per mole are also suitable. Other compounds useful as hydrolysis stabilizers include an epoxy modified acrylic oligomers or polymers, and oligomers based on cycloaliphatic epoxides. Specific examples of suitable epoxy functionalized stabilizers include Cycloaliphatic Epoxide Resin ERL-4221 supplied by Union Carbide Corporation (a subsidiary of Dow Chemical), Danbury, Conn.; and JONCRYL® ADR-4300 and JONCRYL® ADR-4368, available from Johnson Polymer Inc, Sturtevant, Wis. When present, hydrolysis stabilizers can be used in amounts of 0.05 to 1 percent by weight, specifically 0.1 to 0.5 percent by weight, and more specifically 0.12 to 0.3 percent by weight, based on the weight of the polycarbonate used in the thermoplastic composition.

The composition may comprise a colorant such as a pigment and/or dye additive. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates, sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. When present, pigments can be used in amounts of 0.01 to 10 percent by weight, based on the weight of the polycarbonate used in the thermoplastic composition.

Suitable dyes can be organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. When present, dyes can be used in amounts of 0.01 to 10 percent by weight, based on the total weight of the polycarbonate used in the thermoplastic composition.

The composition may optionally comprise an impact modifier to increase its impact resistance, where the impact modifier is present in an amount that does not adversely affect the desired properties of the composition. These impact modifiers include elastomer-modified graft copolymers comprising (i) an elastomeric (i.e., rubbery) polymer substrate having a Tg less than 10° C., more specifically less than −10° C., or more specifically −40° to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than 50 wt % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers.

Suitable conjugated diene monomers for preparing the elastomer phase are of formula (15):

(15)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Vinyl aromatic compounds may be copolymerized with the ethylenically unsaturated nitrile monomer to form a a copolymer, wherein the vinylaromatic compounds can include monomers of formula (16):

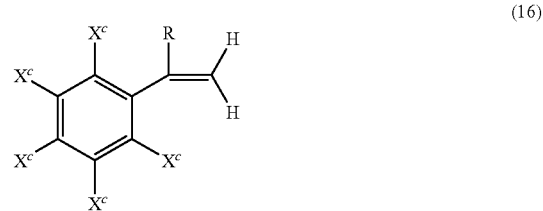

(16)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ arylalkyl, $C_7$-$C_{12}$ alkylaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (17):

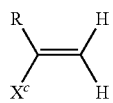

(17)

wherein R is hydrogen, $C_1$-$C_5$ alkyl, bromo, or chloro, and $X^c$ is $C_1$-$C_{12}$ alkoxycarbonyl, $C_1$-$C_{12}$ aryloxycarbonyl, hydroxy carbonyl, or the like. Examples of monomers of formula (17) include, acrylic acid, methyl(meth)acrylate, ethyl(meth)acrylate, n-butyl(meth)acrylate, t-butyl(meth)acrylate, n-propyl (meth)acrylate, isopropyl(meth)acrylate, 2-ethylhexyl(meth) acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 wt % of comonomers of formulas (15), (16), or (17). Exemplary comonomers include but are not limited to butadiene, isoprene, styrene, methyl methacrylate, phenyl methacrylate, penethylmethacrylate, N-cyclohexylacrylamide, vinyl methyl ether, and mixtures comprising at least one of the foregoing comonomers. Optionally, up to 5 wt % of a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth) acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of 0.001 to 25 micrometers, specifically 0.01 to 15 micrometers, or even more specifically 0.1 to 8 micrometers may be used for emulsion based polymerized rubber lattices. A particle size of 0.5 to 10 micrometers, specifically 0.6 to 1.5 micrometers may be used for bulk polymerized rubber substrates. Particle size may be measured by simple light transmittance methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70 wt %. Also suitable are mixtures of butadiene with styrene and/or $C_{4-6}$ alkyl acrylate rubbers.

The elastomeric phase may provide 5 to 95 wt % of the total graft copolymer, more specifically 20 to 90 wt %, and even more specifically 40 to 85 wt % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (16) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (17). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include, methyl (meth)acrylate, ethyl(meth)acrylate, n-propyl(meth)acrylate, isopropyl(meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt % of monovinyl aromatic monomer, specifically 30 to 100 wt %, more specifically 50 to 90 wt % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise 40 to 95 wt % elastomer-modified graft copolymer and 5 to 65 wt % graft (co) polymer, based on the total weight of the impact modifier. In another embodiment, such impact modifiers comprise 50 to 85 wt %, more specifically 75 to 85 wt % rubber-modified graft copolymer, together with 15 to 50 wt %, more specifically 15 to 25 wt % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^d)C(O)OCH_2CH_2R^e$, wherein $R^d$ is hydrogen or a $C_1$-$C_8$ linear or branched alkyl group and Re is a branched $C_3$-$C_{16}$ alkyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane., octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable, alkenyl-containing organic material may be, for example, a monomer of formula (16) or (17), e.g., styrene, alpha-methylstyrene, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from 30° C. to 110° C. to form a silicone rubber latex, in the presence of a surfactant such as dodecylbenzenesulfonic acid. Alternatively, a cyclic siloxane such as cyclooctamethyltetrasiloxane and tetraethoxyorthosilicate may be reacted with a first graft link monomer such as (gamma-methacryloxypropyl)methyldimethoxysilane, to afford silicone rubber having an average particle size from 100 nanometers to 2 micrometers. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from 100 nanometers to 2 micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

The foregoing types of impact modifiers, including SAN copolymers, can be prepared by an emulsion polymerization process that is free of basic materials such as alkali metal salts of $C_{6-30}$ fatty acids, for example sodium stearate, lithium stearate, sodium oleate, potassium oleate, and the like; alkali metal carbonates, amines such as dodecyl dimethyl amine, dodecyl amine, and the like; and ammonium salts of amines, if desired. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate.

A specific impact modifier that may be used in the composition is a methyl methacrylate-butadiene-styrene (MBS) impact modifier. Other examples of elastomer-modified graft copolymers besides ABS and MBS include but are not limited to acrylonitrile-styrene-butyl acrylate (ASA), methyl methacrylate-acrylonitrile-butadiene-styrene (MABS), and acrylonitrile-ethylene-propylene-diene-styrene (AES).

When present, impact modifiers can be present in amounts of from about 0.1 to about 30 percent by weight, based on the weight of the polycarbonate used in the composition.

The composition may include fillers or reinforcing agents. Where used, suitable fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, additional glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly (phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, finite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. When present, fillers can be used in amounts of 0 to 90 percent by weight, based on the weight of the polycarbonate used in the composition.

Visual effect enhancers, sometimes known as visual effects additives or pigments may be present in an encapsulated form, a non-encapsulated form, or laminated to a particle comprising polymeric resin. Some non-limiting examples of visual effects additives are aluminum, gold, silver, copper, nickel, titanium, stainless steel, nickel sulfide, cobalt sulfide, manganese sulfide, metal oxides, white mica, black mica, pearl mica, synthetic mica, mica coated with titanium dioxide, metal-coated glass flakes, and colorants, including but not limited, to Perylene Red. The visual effect additive may have a high or low aspect ratio and may comprise greater than 1 facet. Dyes may be employed such as Solvent Blue 35, Solvent Blue 36, Disperse Violet 26, Solvent Green 3, Anaplast Orange LFP, Perylene Red, and Morplas Red 36. Fluorescent dyes may also be employed including, but not limited to, Permanent Pink R (Color Index Pigment Red 181, from Clariant Corporation), Hostasol Red 5B (Color Index #73300, CAS #522-75-8, from Clariant Corporation) and Macrolex Fluorescent Yellow 10GN (Color Index Solvent Yellow 160:1, from Bayer Corporation). Pigments such as titanium dioxide, zinc sulfide, carbon black, cobalt chromate, cobalt titanate, cadmium sulfides, iron oxide, sodium aluminum sulfosilicate, sodium sulfosilicate, chrome antimony titanium rutile, nickel antimony titanium rutile, and zinc oxide may be employed. Visual effect additives in encapsulated form usually comprise a visual effect material such as a high aspect ratio material like aluminum flakes encapsulated by a polymer. The encapsulated visual effect additive has the shape of a bead. When present, visual effect enhancers can be used in amounts of 0.01 to 10 percent by weight, based on the weight of the polycarbonate used in the composition.

Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. When present, antioxidants can be used in amounts of from about 0.0001 to about 1 percent by weight, based on the weight of the polycarbonate used in the composition.

Suitable heat stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, or combinations comprising at least one of the foregoing heat stabilizers. When present, heat stabilizers can be used in amounts of 0.0001 to 1 percent by weight, based on the weight of the polycarbonate used in the composition.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. When present, light stabilizers can be used in amounts of 0.0001 to 1 percent by weight, based on the weight of the polycarbonate used in the composition.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene)bis (4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with a particle size less than 100 nanometers; or the like, or combinations comprising at least one of the foregoing UV absorbers. When present, UV absorbers can be used in amounts of 0.0001 to 1 percent by weight, based on the weight of the polycarbonate used in the composition.

Plasticizers, lubricants, and/or mold release agents additives may also be used. There is considerable overlap among these types of materials, which include, for example, phthalic acid esters such as dioctyl-4,5-epoxy-hexahydrophthalate; tris(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. When present, such materials can be used in amounts of 0.001 to 1 percent by weight, specifically 0.01 to 0.75 percent by weight, more specifically 0.1 to 0.5 percent by weight, based on the weight of the polycarbonate used in the composition.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat™ 6321 (Sanyo) or Pebax™ MH1657 (Atofina), Irgastat™ P18 and P22 (Ciba-Geigy). Other polymeric materials that may be used as antistatic agents are inherently conducting polymers such as polyaniline (commercially available as PANIPOL® EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. When present, antistatic agents can be used in amounts of 0.0001 to 5 percent by weight, based on the weight of the polycarbonate used in the composition.

In an embodiment, the KSS/NaTS combination of the disclosure can be optionally used with other suitable flame retardant(s), as long as there is no negative effect on the performance or other desired characteristics of the composition, such as being substantially halogen-free, etc. Suitable flame retardant that may be added may be organic compounds that include phosphorus. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups may be joined together to provide a cyclic group, for example, diphenyl pentaerythritol diphosphate. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis (dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

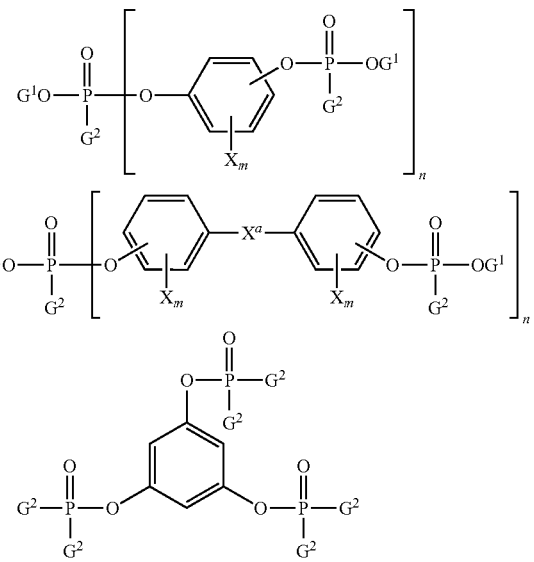

wherein each $G^1$ is independently a hydrocarbon having 1 to 30 carbon atoms; each $G^2$ is independently a hydrocarbon or hydrocarbonoxy having 1 to 30 carbon atoms; each $X^a$ is independently a hydrocarbon having 1 to 30 carbon atoms; each X is independently a bromine or chlorine; m is 0 to 4, and n is 1 to 30. Examples of suitable di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester am ides, phosphoric acid am ides, phosphonic acid amides, phosphinic acid amides, and tris(aziridinyl) phosphine oxide. When present, phosphorus-containing flame retard ants can be present in amounts of 0.1 to 10 percent by weight, based on the weight of the polycarbonate used in the composition.

Inorganic flame retardants may also be used, for example salts of $C_{2-6}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoroanion complexes such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts can be present in amounts of 0.1 to 5 percent by weight, based on the weight of the polycarbonate used in the composition.

Radiation stabilizers may also be present, specifically gamma-radiation stabilizers. Suitable gamma-radiation stabilizers include diols, such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; alicyclic alcohols such as 1,2-cyclopentanediol, 1,2-cyclohexanediol, and the like; branched acyclic diols such as 2,3-dimethyl-2,3-butanediol(pinacol), and the like, and polyols, as well as alkoxy-substituted cyclic or acyclic alkanes. Alkenols, with sites of unsaturation, are also a useful class of alcohols, examples of which include 4-methyl-4-penten-2-ol, 3-methyl-pentene-3-ol, 2-methyl-4-penten-2-ol, 2,4-dimethyl-4-pene-2-ol, and 9-decen-1-ol. Another class of suitable alcohols is the tertiary alcohols, which have at least one hydroxy substituted tertiary carbon. Examples of these include 2-methyl-2,4-pentanediol (hexylene glycol), 2-phenyl-2-butanol, 3-hydroxy-3-methyl-2-butanone, 2-phenyl-2-butanol, and the like, and cycoloaliphatic tertiary carbons such as 1-hydroxy-1-methyl-cyclohexane. Another class of suitable alcohols is hydroxymethyl aromatics, which have hydroxy substitution on a saturated carbon attached to an unsaturated carbon in an aromatic ring. The hydroxy-substituted saturated carbon may be a methylol group (—$CH_2OH$) or it may be a member of a more complex hydrocarbon group such as would be the case with (—$CR^4HOH$) or (—$CR^4_2OH$) wherein $R^4$ is a complex or a simple hydrocarbon. Specific hydroxy methyl aromatics may be benzhydrol, 1,3-benzenedimethanol, benzyl alcohol, 4-benzyloxy benzyl alcohol and benzyl benzyl alcohol. Specific alcohols are 2-methyl-2,4-pentanediol (also known as hexylene glycol), polyethylene glycol, and polypropylene glycol. When present, radiation stabilizers are typically used in amounts of 0.001 to 1 wt %, more specifically 0.01 to 0.5 wt %, based on the weight of the polycarbonate used in the composition.

Non-limiting examples of processing aids that can be used include Doverlube® FL-599 (available from Dover Chemical Corporation), Polyoxyter® (available from Polychem Alloy Inc.), Glycolube P (available from Lonza Chemical Company), pentaerythritol tetrastearate, Metablen A-3000 (available from Mitsubishi Rayon), neopentyl glycol dibenzoate, and the like. When present, processing aids can be used in amounts of 0.001 to 1 percent by weight, based on the weight of the polycarbonate used in the composition.

The composition may be manufactured by methods generally available in the art, for example, in one embodiment, in one manner of proceeding, powdered polycarbonate, and any optional additive(s) are first blended, in a HENSCHEL-Mixer® high speed mixer. Other low shear processes including but not limited to hand mixing may also accomplish this blending. The blend is then fed into the throat of an extruder via a hopper. Alternatively, one or more of the components may be incorporated into the composition by feeding directly into the extruder at the throat and/or downstream through a sidestuffer. Additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

In a specific embodiment, a method of preparing a thermoplastic article comprises melt combining a polycarbonate, and any optional additive(s), to form a thermoplastic composition. The melt combining can be done by extrusion. In an embodiment, the proportions of polycarbonate, and any optional additive(s) are selected such that the optical properties of the composition are maximized while mechanical performance is at a desirable level.

In a specific embodiment, the extruder is a twin-screw extruder. The extruder is typically operated at a temperature of 180 to 385° C., specifically 200 to 330° C., more specifically 220 to 300° C., wherein the die temperature may be different. The extruded composition is quenched in water and pelletized.

Shaped, formed, or molded articles comprising the compositions are also provided. The compositions may be molded into useful shaped articles by a variety of means such as injection molding, extrusion, rotational molding, blow molding and thermoforming. In a specific embodiment, molding is done by injection molding. Desirably, the thermoplastic composition has excellent mold filling capability and is useful to form mechanical parts and automobile parts articles such as bottles, tubing, beakers, centrifuge tubes, pipettes, glucose meters, inhalers, trays, dental instruments, and the like.

Unless specified differently, the flame retardancy of the compositions disclosed herein was determined by UL 94 Flammability Testing standards. In this regard, there are generally two types of pre-selection test programs conducted by Underwriters Laboratory (UL) on plastic materials to measure flammability characteristics. The first determines the material's tendency either to extinguish or to spread the flame once the specimen has been ignited. This program is described in UL 94, The Standard for Flammability of Plastic Materials for Parts in Devices and Appliances, which is now harmonized with IEC 60707, 60695-11-10 and 60695-11-20 and ISO 9772 and 9773, which is incorporated fully herein by reference.

The second test program measures the ignition resistance of the plastic to electrical ignition sources. The material's resistance to ignition and surface tracking characteristics is described in UL 746A, which is similar to the test procedures described in IEC 60112, 60695 and 60950.

With respect to UL 94, there are 12 flame classifications specified therein that are assigned to materials based on the results of small-scale flame tests. These classifications, listed below in descending order of flammability, are used to distinguish a material's burning characteristics after test specimens have been exposed to a specified test flame under controlled laboratory conditions.

Six of the classifications relate to materials commonly used in manufacturing enclosures, structural parts and insulators found in consumer electronic products (5VA, 5VB, V-0, V-1, V-2, HB).

Three of the remaining six classifications relate to low-density foam materials commonly used in fabricating speaker grills and sound-deadening material (HF-1, HF-2, HBF).

The last three classifications are assigned to very thin films, generally not capable of supporting themselves in a horizontal position (VTM-0, VTM-1, VTM-2). These are usually assigned to substrates on flexible printed circuit boards.

During testing, specimens molded from the plastic material are oriented in either a horizontal or vertical position, depending on the specifications of the relevant test method, and are subjected to a defined flame ignition source for a specified period of time. In some tests, the test flame is only applied once, as is the case of the horizontal burning (HB) test, while in other tests the flame is applied twice or more.

A HB flame rating indicates that the material was tested in a horizontal position and found to burn at a rate less than a specified maximum. The three vertical ratings, V2, V1 and V0 indicate that the material was tested in a vertical position and self-extinguished within a specified time after the ignition source was removed. The vertical ratings also indicate whether the test specimen dripped flaming particles that ignited a cotton indicator located below the sample. UL 94 also describes a method in which the test flame is applied for up to five applications, in testing for a 5VA or 5VB classification. These small-scale tests measure the propensity of a material to extinguish or spread flames once it becomes ignited.

A more detailed explanation of the parameters for a UL 94 V0 flammability rating utilized herein are set forth below.

The disclosure is further illustrated by the following non-limiting examples.

EXAMPLES

A series of experimental runs were carried out with glass fiber filled polycarbonate compositions containing neutral and white color packages (more details below), as these two color packages appear to be the more challenging color packages for glass fiber filled polycarbonates due to relatively high loadings of $TiO_2$, etc. The glass fiber (GF) was E-type non-binding glass fiber from Owens-Corning Fiberglass (Tradename 415A-14C). It had a fiber length of 4 mm and a filament diameter of 14 micrometers. LEXAN® EXL is C9030 P, which is PC-siloxane copolymer with 20% siloxane segments by weight. The heat stabilizer utilized was IRGAPHOS™ 168 (tris(2,4-di-t-butylphenyl)phosphite). The UV stabilizer was 2-(2H-benzotriazol-2-yl)-4-(1,1,3,3-tetramethylbutyl) phenol (CYASORB™ 5411). The mold release agent was pentaethyritol tetrastearate. The white pigment was $TiO_2$. The colorant was yellow color, Quinophthalone Yellow PY 138. The polycarbonates utilized, i.e. PC1 and PC2, have the following general characteristics: The polycarbonate PC1 used was high flow Bisphenol-A polycarbonate prepared by the interfacial method with a target molecular weight of 21,900 (based on Gel Permeation chromatography measurements using polycarbonate standards), and the polycarbonate PC2 used was low flow Bisphenol-A polycarbonate prepared by the interfacial method with a target molecular weight of 29,900 (based on Gel Permeation chromatography measurements using polycarbonate standards).

Flammability testing on the molded compositions was conducted using the statistical "UL Tool" in which 5 bars, at the specified thickness, were burned using the UL94 test protocol and the total flame-out-time was calculated. Two bars with thickness 1.6 mm and 1.2 mm respectively were tested. The table below shows the general criteria for V0, V1 and V2 under UL94 standards.

| Test Type | UL94 V0 | UL94 V1 | UL94 V2 |
|---|---|---|---|
| Each flame out time (t1 or t2) | <=10 s | <=30 s | <=30 s |
| Total afterflame time for 5 specimen (t1 + t2) | <=50 | <=250 | <=250 |
| Afterflame or afterglow time for each specimen (t2 + t3) | <=30 s | <=60 s | <=60 s |
| Afterflame or afterglow up to the holding clamp | No | No | No |
| Cotton Ignited | No | No | Yes |

Mechanical properties of the molded compositions were measured via ASTM standards as shown below.

| Testing Method, Standards and Specimen Type | | | |
|---|---|---|---|
| | Standards | Testing Conditions | Specimen Type |
| ASH | | Muffle | Pellets |
| Flexual | ISO 178 | 2 mm/min | 80*10*4 |
| Notched Izod Impact | ISO 180/1A | 23 C. | 80*10*4 |
| HDT | ISO 75/Af | 1.8 MPa | 80*10*4 |
| Melt Volume Index | ASTM D 1238 | 300 C., 1.2 Kg/6 min dwell | Pellets |
| Abusive Melt Volume Index | ASTM D 1238 | 300 C., 1.2 Kg/18 min dwell | Pellets |

Experiments were carried out based on different-ratios of KSS/NaTS in the PC/GF and PC/EXL/GF matrixes. Since both components were added at very low levels, 0.2% water was used as carrier to make a solution, and then the solution was pre-blended with all the other resins and additives before extrusion. In the experiments below, the compositions are listed by their parts per weight.

As indicated in Table 1, a robust UL 94 V0 rating at 1.6 mm could not be achieved for the PC/GF compositions with 0.0007 w % KSS and 0.4 w % NaTS (neither neutral color nor white color). This indicated that the KSS/NaTS combinations did not produce enhanced UL performance in PC/GF compositions alone.

TABLE 1

The 1st Experiments on KSS/NaTS Package 1.6 mm V0

| | 1-1 | 1-2 | 1-3 | 1-4 | 1-5 |
|---|---|---|---|---|---|
| PC1 | 43.9 | 43.9 | 43.9 | 43.9 | 43.9 |
| PC2 | 46 | 46 | 46 | 46 | 46 |
| Glass Fiber | 9 | 9 | 9 | 9 | 9 |
| Anti-dripping Additive | 0.2 | 0.2 | 0.2 | 0.2 | 0.2 |
| Heat Stabilizer | 0.05 | 0.05 | 0.05 | 0.05 | 0.05 |
| Mold Release | 0.3 | 0.3 | 0.3 | 0.3 | 0.3 |
| UV Stabilizer | 0.15 | 0.15 | 0.15 | 0.15 | 0.15 |
| Water | 0.2 | 0.2 | 0.2 | 0.2 | 0.2 |
| KSS | | 0.0007 | | 0.0007 | 0.0007 |
| NaTS | | | 0.04 | 0.04 | 0.04 |
| $TiO_2$ | | | | | 2 |
| UL 94 Rating at 1.6 mm | V2 | V2 | V2 | V1 | V1 |

However, as shown in Table 2, with the same KSS and NaTS loadings as that in Table 1, KSS/NaTS combinations exhibited a synergistic effect in the PC/EXL/GF compositions. A formula with 0.0007 parts by weight KSS and 0.04 parts by weight NaTS achieved V0 at 1.6 mm in both neutral and white color (see formulations 2-4 and 2-5), while the contrast formulations (or formulations without EXL in Table 1) failed. See formulations 1-4 and 1-5. In Table 2, formulations 2-1, 2-2 and 2-3 were comparison runs without any KSS and NaTS, with only KSS, or with only NaTS in the formulations, from which one could see that little benefit was gained with a sole component additive.

TABLE 2

The 2nd Experiments on KSS/NaTS Package 1.6 mm V0

|  | 2-1 | 2-2 | 2-3 | 2-4 | 2-5 |
|---|---|---|---|---|---|
| EXL (C9030P) | 12 | 12 | 12 | 12 | 12 |
| PC1 | 43.9 | 43.9 | 43.9 | 43.9 | 43.9 |
| PC2 | 34 | 34 | 34 | 34 | 34 |
| Glass Fiber | 9 | 9 | 9 | 9 | 9 |
| Anti-dripping Additive | 0.2 | 0.2 | 0.2 | 0.2 | 0.2 |
| Heat Stabilizer | 0.05 | 0.05 | 0.05 | 0.05 | 0.05 |
| Mold Release | 0.3 | 0.3 | 0.3 | 0.3 | 0.3 |
| UV Stabilizer | 0.15 | 0.15 | 0.15 | 0.15 | 0.15 |
| Water | 0.2 | 0.2 | 0.2 | 0.2 | 0.2 |
| KSS |  | 0.0007 |  | 0.0007 | 0.0007 |
| NaTS |  |  | 0.04 | 0.04 | 0.04 |
| $TiO_2$ |  |  |  |  | 2 |
| UL 94 Rating at 1.6 mm | V1 | V1 | V1 | V0 | V0 |

Further, it was also found that one could get robust V0 performance at 1.6 mm at both normal (23° C., 48 Hr) and aging (70° C., 168 Hr) conditions, with wide loading levels of KSS/NaTS. See Table 3 below. Also a control sample for comparison was set for each run, and the FR package used was standard KSS loading plus 0.2% TSAN as an anti-drip agent.

In Table 3, the tests data indicated that this flame retardant package did not have any impact on mechanical performance. All formulations showed good modulus, HDT and Izod data, similar to that of the control formulation (3-1). Further, it was found that a combination of a potassium salt of a diphenylsulfone sulfonate (KSS) and a sodium salt of toluene sulfonic acid (NaTS) acted synergistically at low levels in polycarbonate compositions in the absence of halogenated flame-retardant additives and in presence of an anti-drip agent. For example, in the presence of an anti-drip agent, a combination of 0.005 parts per weight KSS and 0.025 parts per weight NaTS led to UL94 V0 performance at 1.6 mm.

TABLE 3

The 3rd Experiments on KSS/NaTS Package 1.6 mm V0

|  | 3-1 | 3-2 | 3-3 | 3-4 | 3-5 | 3-6 | 3-7 | 3-8 | 3-9 | 3-10 | 3-11 |
|---|---|---|---|---|---|---|---|---|---|---|---|
| EXL (C9030P) | 12 | 12 | 12 | 12 | 12 | 12 | 12 | 12 | 12 | 12 | 12 |
| PC1 | 43.9 | 43.9 | 43.9 | 43.9 | 43.9 | 43.9 | 43.9 | 43.9 | 43.9 | 43.9 | 43.9 |
| PC2 | 34 | 34 | 34 | 34 | 34 | 34 | 34 | 34 | 34 | 34 | 34 |
| Glass Fiber | 9 | 9 | 9 | 9 | 9 | 9 | 9 | 9 | 9 | 9 | 9 |
| Anti-Dripping Additive | 0.2 | 0.2 | 0.2 | 0.2 | 0.2 | 0.2 | 0.2 | 0.2 | 0.2 | 0.2 | 0.2 |
| Heat Stabilizer | 0.05 | 0.05 | 0.05 | 0.05 | 0.05 | 0.05 | 0.05 | 0.05 | 0.05 | 0.05 | 0.05 |
| Mold Release | 0.3 | 0.3 | 0.3 | 0.3 | 0.3 | 0.3 | 0.3 | 0.3 | 0.3 | 0.3 | 0.3 |
| UV Stabilizer | 0.15 | 0.15 | 0.15 | 0.15 | 0.15 | 0.15 | 0.15 | 0.15 | 0.15 | 0.15 | 0.15 |
| Water | 0.2 | 0.2 | 0.2 | 0.2 | 0.2 | 0.2 | 0.2 | 0.2 | 0.2 | 0.2 | 0.2 |
| $TiO_2$ | 2 | 2 | 2 | 2 | 2 | 2 | 2 | 2 | 2 | 2 | 2 |
| Color | 0.03 | 0.03 | 0.03 | 0.03 | 0.03 | 0.03 | 0.03 | 0.03 | 0.03 | 0.03 | 0.03 |
| KSS | 0.4 | 0.005 | 0.005 | 0.005 | 0.015 | 0.015 | 0.015 | 0.025 | 0.025 | 0.025 | 0.025 |
| NaTS |  | 0.017 | 0.025 | 0.025 | 0.008 | 0.015 | 0.017 | 0.008 | 0.017 | 0.025 | 0.025 |
| UL 94 Rating at 1.6 mm | V0 | V0 | V0 | V0 | V0 | V0 | V0 | V0 | V0 | V0 | V0 |
| MVR/cm3/10 min | 7.0 | 9.1 | 8.0 | 7.6 | 8.0 | 8.1 | 7.9 | 8.1 | 7.5 | 8.0 | 8.1 |
| Abusive-MVR/cm3/10 min | 8.1 | 10.6 | 9.3 | 9.1 | 8.9 | 9.1 | 9.0 | 9.2 | 8.9 | 9.2 | 9.5 |
| Flexual Modulus/Mpa | 3401 | 3315 | 3344 | 3327 | 3306 | 3285 | 3293 | 3312 | 3341 | 3306 | 3379 |
| HDT/Degree-C. | 133 | 131 | 131 | 130 | 132 | 132 | 131 | 132 | 131 | 132 | 131 |
| Izod/KJ/m2 | 25 | 22 | 22 | 23 | 22 | 25 | 22 | 22 | 23 | 23 | 22 |

A further study (the 4th runs) was carried out with even higher loading levels of NaTS and lower loading levels of KSS, since this trend was shown to be positive according to Table 3 data above. In Table 4, differences in KSS levels were explored, starting from about one tenth (i.e. 0.00044) of its loading in former run (i.e. 0.005) with NaTS loadings being relatively constant at high end. In particular, the amount of KSS ranged from 0.00044% to 0.001%; and the amount of NaTS ranged from 0.03% to 0.05%. Most of the formulations in this run showed good flame retardance performance. This indicated a promising workable design for 1.2 mm UL V0 performance. Moreover, UL 94 flame tests at 1.6 mm indicated that the formulas could pass at both normal and aging conditions; and when the thickness was changed to 1.2 mm, the 4-5, 4-6, 4-7 and 4-8 formulas passed the flame test at both conditions.

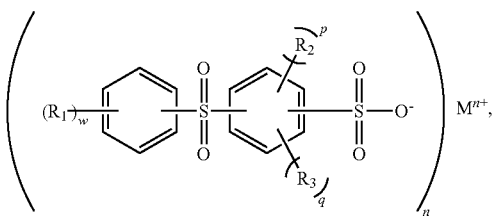

wherein $R_1$, $R_2$, and $R_3$ are independently selected from a $C_1$-$C_6$ alkyl group; M is a metal; n is an integer and $1 \leq n \leq 3$; w is an integer and $0 \leq w \leq 5$; p and q are integers, $p \geq 0$, $q \geq 0$, and $p+q \leq 4$.

TABLE 4

The 4th Experiments on KSS/NaTS Package 1.2 mm V0

|  | 4-1 | 4-2 | 4-3 | 4-4 | 4-5 | 4-6 | 4-7 | 4-8 | 4-9 |
|---|---|---|---|---|---|---|---|---|---|
| EXL (C9030P) | 12 | 12 | 12 | 12 | 12 | 12 | 12 | 12 | 12 |
| PC 1 | 43.9 | 43.9 | 43.9 | 43.9 | 43.9 | 43.9 | 43.9 | 43.9 | 43.9 |
| PC 2 | 34 | 34 | 34 | 34 | 34 | 34 | 34 | 34 | 34 |
| Glass Fiber | 9 | 9 | 9 | 9 | 9 | 9 | 9 | 9 | 9 |
| Anti-Dripping Additive | 0.2 | 0.2 | 0.2 | 0.2 | 0.2 | 0.2 | 0.2 | 0.2 | 0.2 |
| Heat Stabilizer | 0.05 | 0.05 | 0.05 | 0.05 | 0.05 | 0.05 | 0.05 | 0.05 | 0.05 |
| Mold Release | 0.3 | 0.3 | 0.3 | 0.3 | 0.3 | 0.3 | 0.3 | 0.3 | 0.3 |
| Water | 0.2 | 0.2 | 0.2 | 0.2 | 0.2 | 0.2 | 0.2 | 0.2 | 0.2 |
| $TiO_2$ | 2 | 2 | 2 | 2 | 2 | 2 | 2 | 2 | 2 |
| Color | 0.23 | 0.23 | 0.23 | 0.23 | 0.23 | 0.23 | 0.23 | 0.23 | 0.23 |
| KSS | 0.4 | 0.00044 | 0.00066 | 0.00066 | 0.00066 | 0.00066 | 0.001 | 0.001 | 0.005 |
| NaTS |  | 0.045 | 0.03 | 0.035 | 0.04 | 0.05 | 0.035 | 0.045 | 0.025 |
| MVR | 7.45 | 6.61 | 6.83 | 6.8 | 6.83 | 6.55 | 6.73 | 6.69 | 6.71 |
| UL 94 Rating at 1.6 mm | V0 | V0 | V0 | V0 | V0 | V0 | V0 | V0 | V0 |
| UL 94 Rating at 1.2 mm | V1 | V1 | V1 | V0 | V0 | V0 | V0 | V0 | V1 |

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

The invention claimed is:

1. A flame retardant composition comprising (i) 100 parts by weight of a polycarbonate; (ii) from about 5 parts to about 40 parts by weight of glass fibers; (iii) from about 5 parts to about 30 parts by weight of a polysiloxane-polycarbonate copolymer; (iv) from about 0.0001 parts to about 0.2 parts by weight of an aromatic sulfone sulfonate; (v) from about 0.002 parts to about 0.5 parts by weight of an aromatic sulfonate; and (vi) optionally from about 0.01 parts to about 0.3 parts by weight of an anti-drip agent, wherein a molded sample of the composition is able to achieve a UL 94 V0 rating at a thickness of 1.6 mm.

2. The flame retardant composition according to claim 1, wherein a molded sample of the composition is able to achieve a UL 94 V0 rating at a thickness of 1.2 mm.

3. The flame retardant composition according to claim 1, in which the aromatic sulfone sulfonate comprises a formula (K-1) compound:

4. The flame retardant composition according to claim 1, in which the aromatic sulfone sulfonate comprises a formula (K-2) compound or potassium diphenylsulfone sulfonate (KSS):

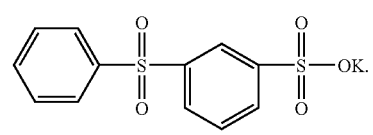

5. The flame retardant composition according to claim 1, in which the aromatic sulfonate comprises a formula (N-1) compound:

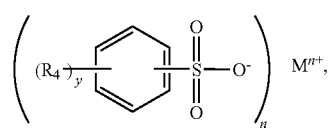

wherein $R_4$ is selected from a $C_1$-$C_6$ alkyl group; M is a metal; n is an integer and $1 \leq n \leq 3$; y is an integer and $0 \leq y \leq 5$.

6. The flame retardant composition according to claim 1, in which the aromatic sulfonate comprises a formula (N-2) compound or a sodium salt of toluene sulfonic acid (NaTS):

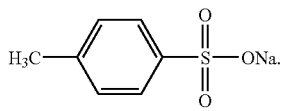

7. The flame retardant composition according to claim 1, in which the anti-drip agent comprises a fluoropolymer-based anti-drip agent.

8. The flame retardant composition according to claim 7, in which the content of halogen is controlled to be no more than about 0.1% by weight, based on the total weight of the composition.

9. The flame retardant composition according to claim 1, in which the anti-drip agent comprises TSAN.

10. The flame retardant composition according to claim 1, which comprises (i) 100 parts by weight of polycarbonate; (ii) from about 5 parts to about 40 parts by weight of glass fibers; (iii) from about 5 parts to about 30 parts by weight of a polysiloxane-polycarbonate copolymer; (iv) from about 0.0001 parts to about 0.2 parts by weight of KSS; (v) from about 0.002 parts to about 0.5 parts by weight of NaTS; and
 (vi) optionally from about 0.01 parts to about 0.26 parts by weight of TSAN.

11. The flame retardant composition according to claim 10, which comprises from about 0.00066 parts to about 0.001 parts by weight of KSS.

12. The flame retardant composition according to claim 10, which comprises from about 0.04 parts to about 0.055 parts by weight of NaTS.

13. The flame retardant composition according to claim 10, which comprises from about 0.15 parts to about 0.26 parts by weight of TSAN.

14. The flame retardant composition according to claim 1, in which the polycarbonate comprises repeating structural carbonate units of the formula (A-1):

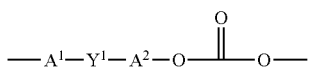

wherein each of $A^1$ and $A^2$ is a monocyclic divalent aryl radical and $Y^1$ is a bridging radical having one or two atoms that separate $A^1$ from $A^2$.

15. The flame retardant composition according to claim 1, in which the polycarbonate comprises repeating structural carbonate units of the formula (A-2):

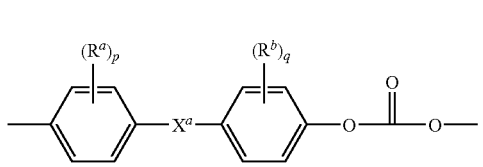

wherein $R^a$ and $R^b$ each represent a halogen atom or a monovalent hydrocarbon group and may be the same or different; p and q are each independently integers of 0 to 4; and $X^a$ represents one of the groups of formula (5):

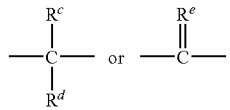

wherein $R^c$ and $R^d$ each independently represent a hydrogen atom or a monovalent linear or cyclic hydrocarbon group and $R^e$ is a divalent hydrocarbon group.

16. The flame retardant composition according to claim 1, in which the polycarbonate comprises repeating structural carbonate units of the formula (A-3):

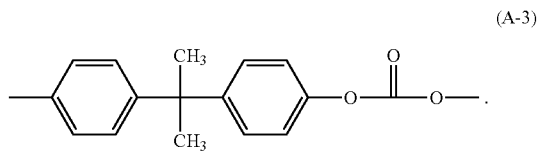

17. The flame retardant composition according to claim 1, in which the polysiloxane-polycarbonate copolymer comprises from about 50% by weight to about 99% by weight of carbonate units and from about 1% by weight to about 50% by weight of siloxane units.

18. The flame retardant composition according to claim 1, in which the amount of the polysiloxane-polycarbonate copolymer is from about 12% by weight to about 20% by weight, based on the total weight of component (i) polycarbonate in the composition.

19. The flame retardant composition according to claim 1, further comprising one or more optional additives selected from the group consisting of hydrolysis stabilizer, impact modifier, filler/reinforcing agent, visual effect enhancer, antioxidant, heat stabilizer, light stabilizer, ultraviolet light absorber, plasticizer, mold release agent, lubricant, antistatic agent, pigment, dye, processing aid, radiation stabilizer, and combinations thereof.

20. A flame retardant article made from the composition according to claim 1.

21. A flame retardant composition comprising (i) 100 parts by weight of a polycarbonate; (ii) from about 6 parts to about 20 parts by weight of glass fibers; (iii) from about 12 parts to about 20 parts by weight of a polysiloxane-polycarbonate copolymer; (iv) from about 0.0003 parts to about 0.01 parts by weight of potassium diphenylsulfone sulfonate (KSS); and (v) from about 0.006 parts to about 0.01 parts by weight of the sodium salt of toluene sulfonic acid (NaTS), wherein a molded sample of the composition is able to achieve a UL 94 V0 rating at a thickness of 1.6 mm.

22. The composition of claim 21, wherein the composition comprises from about 0.00044 to about 0.005 parts by weight of KSS and from about 0.008 to about 0.05 parts by weight of NaTS.

23. The composition of claim 21, wherein the polycarbonate contains no halogen atoms.

* * * * *